US009769559B2

(12) United States Patent
Shi (10) Patent No.: US 9,769,559 B2
(45) Date of Patent: *Sep. 19, 2017

(54) SOUND TRANSDUCER ACOUSTIC BACK CAVITY SYSTEM

(71) Applicant: Nokia Corporation, Espoo (FI)

(72) Inventor: Shengrong Shi, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,002

(22) Filed: Apr. 22, 2016

(65) Prior Publication Data

US 2016/0241950 A1 Aug. 18, 2016

Related U.S. Application Data

(63) Continuation of application No. 14/419,241, filed as application No. PCT/CN2012/080043 on Aug. 13, 2012, now Pat. No. 9,326,054.

(51) Int. Cl.
H04R 1/02 (2006.01)
H04R 1/28 (2006.01)
H04M 1/03 (2006.01)
H04R 31/00 (2006.01)

(52) U.S. Cl.
CPC .......... *H04R 1/2857* (2013.01); *H04M 1/035* (2013.01); *H04R 1/02* (2013.01); *H04R 1/2811* (2013.01); *H04R 1/2819* (2013.01); *H04R 31/006* (2013.01); *H04R 2499/11* (2013.01); *Y10T 29/49005* (2015.01)

(58) Field of Classification Search
CPC ... H04R 5/02; H04R 1/02; H04R 1/28; H04R 1/2807; H04R 1/025; H04R 1/026

USPC ................ 381/306, 333, 337–338, 351, 388
See application file for complete search history.

(56) References Cited

U.S. PATENT DOCUMENTS

| 2,739,659 A | 3/1956 | Daniels .................... 381/357 |
| 2,866,514 A | 12/1958 | Weathers ..................... 381/351 |
| 4,742,887 A | 5/1988 | Yamagishi ................... 381/380 |
| 5,012,890 A | 5/1991 | Nagi et al. .................. 181/153 |
| 5,025,885 A | 6/1991 | Froeschle .................... 381/335 |
| 6,002,781 A | 12/1999 | Takayama et al. ........... 381/351 |
| 6,324,292 B1 | 11/2001 | Mitsuhashi et al. .......... 381/351 |
| 6,411,720 B1 | 6/2002 | Pritchard ..................... 381/351 |
| 6,504,938 B1 | 1/2003 | Anderson et al. ............ 381/351 |
| 2004/0142731 A1 | 7/2004 | Ho et al. |
| 2004/0170291 A1 | 9/2004 | Eaton |
| 2010/0331058 A1 | 12/2010 | Qingshan et al. |
| 2012/0099751 A1 | 4/2012 | Hampton et al. |
| 2012/0202559 A1 | 8/2012 | Shiogama et al. |

FOREIGN PATENT DOCUMENTS

| CN | 1236251 A | 11/1999 |
| CN | 1943268 | 4/2007 |
| CN | 101917652 A | 12/2010 |

(Continued)

*Primary Examiner* — Suhan Ni
(74) *Attorney, Agent, or Firm* — Harrington & Smith (57) ABSTRACT

An apparatus including a housing member and an airflow spreader. The housing member includes an acoustic back cavity for a sound transducer and at least two second cavities in the housing member spaced from the acoustic back cavity. The airflow spreader is connected to the housing member. The airflow spreader includes a conduit system connecting the acoustic back cavity directly with each of the at least two second cavities through the airflow spreader.

20 Claims, 9 Drawing Sheets

(56) References Cited

FOREIGN PATENT DOCUMENTS

| | | |
|---|---|---|
| EP | 1091539 | 4/2001 |
| JP | H-01241297 A | 9/1989 |
| WO | WO-2011/076289 A1 | 6/2011 |

SOUND TRANSDUCER ACOUSTIC BACK CAVITY SYSTEM

CROSS-REFERENCE TO RELATED APPLICATIONS

This application claims priority as a continuation of U.S. application Ser. No. 14/419,241, filed on Feb. 2, 2015, which is itself a National Stage application of Application No. PCT/CN2012/080043, filed on Aug. 13, 2012. Both of these \applications are assigned to the assignee of the present application and are incorporated herein by reference in their entirety.

BACKGROUND

Technical Field

The exemplary and non-limiting embodiments relate generally to sound enhancement and, more particularly, to an acoustic back cavity for a sound transducer.

Brief Description of Prior Developments

Use of an acoustic back cavity is known for low frequency sounds originating from a speaker adjacent the acoustic back cavity.

SUMMARY

The following summary is merely intended to be exemplary. The summary is not intended to limit the scope of the claims.

In accordance with one aspect, an example embodiment comprises an apparatus including a housing member and an airflow spreader. The housing member includes an acoustic back cavity for a sound transducer and one or more second cavities in the housing member spaced from the acoustic back cavity. The airflow spreader is connected to the housing member. The airflow spreader includes a conduit system connecting the acoustic back cavity directly with each of the one or more second cavities through the airflow spreader.

In accordance with another aspect, an example embodiment comprises an apparatus including a sound transducer; a housing having the sound transducer connected thereto; and an acoustic back cavity system comprising a main back cavity in the housing coupled with the sound transducer and a plurality of spaced additional cavities in the housing connected in parallel with the main back cavity by a substantially closed air conduit system.

In accordance with another aspect, an example method comprises providing a housing member with an acoustic back cavity for a sound transducer and a plurality of spaced additional cavities; and connecting an airflow spreader to the housing member to provide an air conduit system connecting the back cavity directly with each of the plurality of spaced additional cavities through the airflow spreader.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
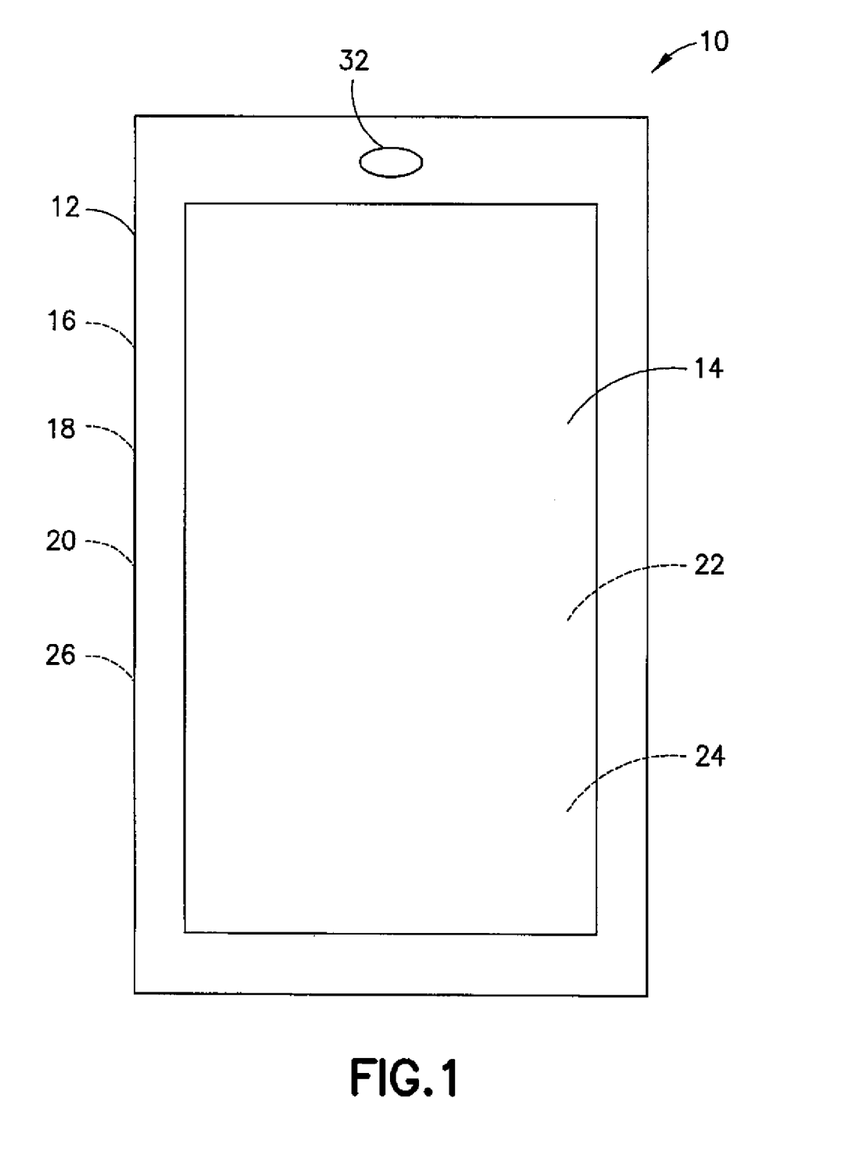
FIG. 1 is a front view of an example embodiment of an apparatus.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held communications device which includes a telephone application. The apparatus 10 may also comprise an Internet browser application, camera application, video recorder application, music player and recorder application, email application, navigation application, gaming application, and/or any other suitable electronic device application. The apparatus 10, in this example embodiment, comprises a housing 12, a display 14, a receiver 16, a transmitter 18, a rechargeable battery 26, and a controller 20 which can include at least one processor 22, at least one memory 24, and software. However, all of these features are not necessary to implement the features described below.

The receiver 16 and transmitter 18 form a primary communications system to allow the apparatus to communicate with a wireless telephone system, such as a mobile telephone base station for example.

Figure 2:
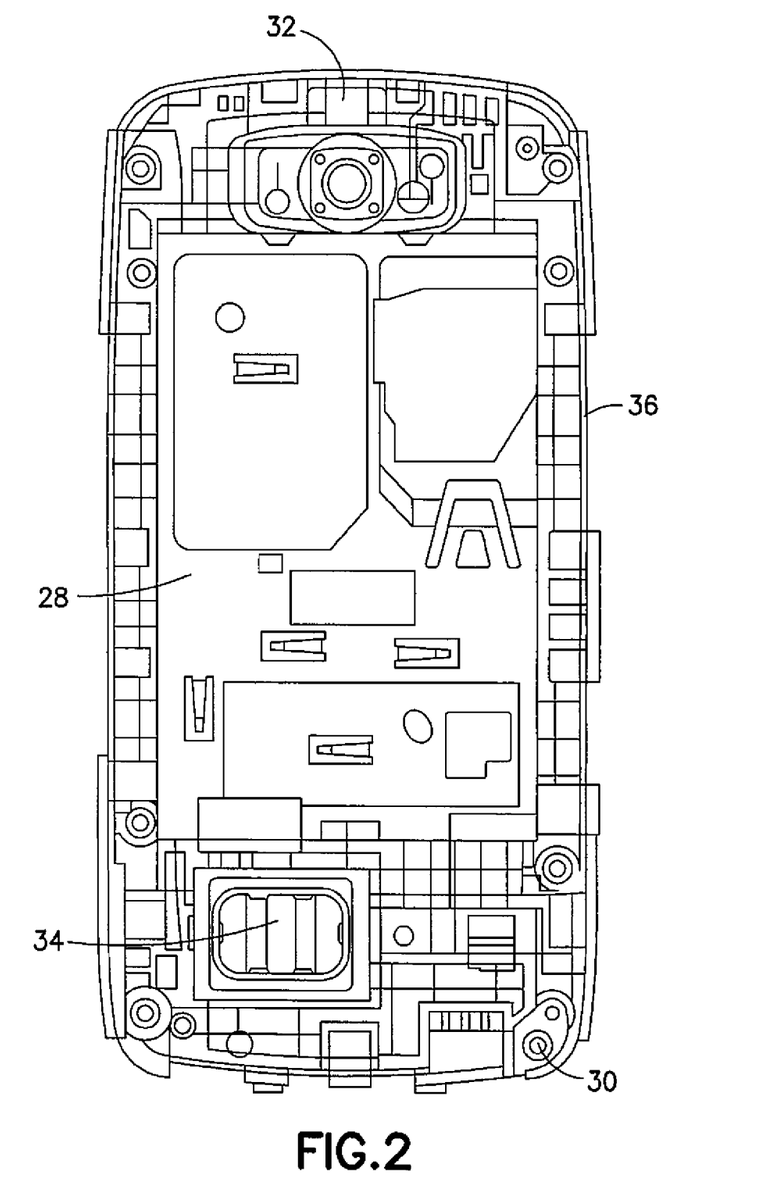
FIG. 2 is a diagram illustrating the cover of the apparatus shown in FIG. 1 and some of the components inside the cover.

The display 14 in this example may be a touch screen display which functions as both a display screen and as a user input. However, features described herein may be used in a display which does not have a touch, user input feature. The user interface may also include a keypad (not shown). Referring also to FIG. 2, the electronic circuitry inside the housing 12 may comprise at least one printed wiring board (PWB) 28 having components such as the controller 20 thereon. The circuitry may include a sound transducer 30 provided as a microphone, a sound transducer 32 provided as an earpiece, and a sound transducer 34 provided as a speaker. These components are shown mounted on a cover 36 of the housing 12.

Figure 3:
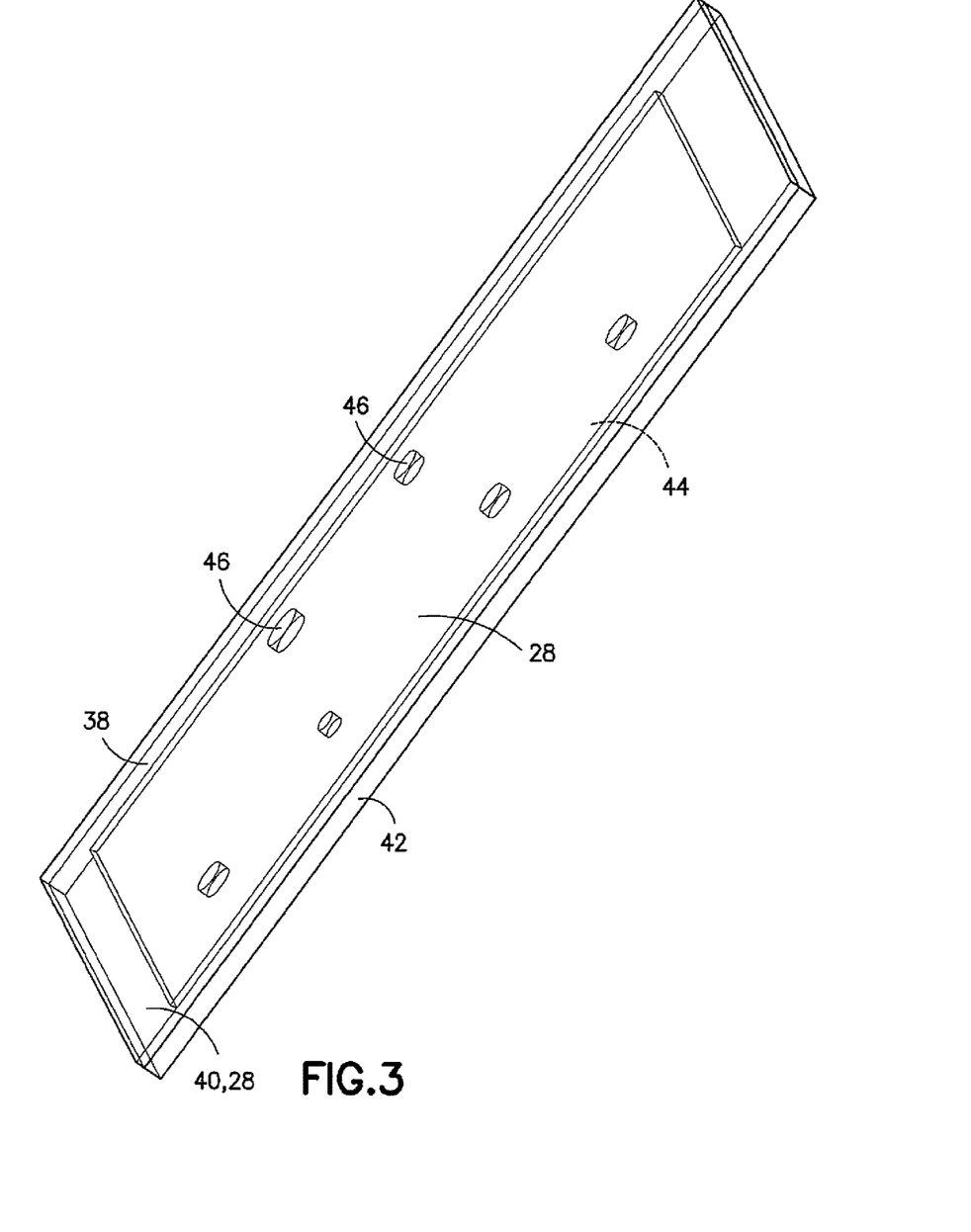
FIG. 3 is a diagram illustrating an airflow spreader of the apparatus shown in FIG. 1.

Referring also to FIG. 3, the apparatus 10 also comprises an airflow spreader 38. In this example the airflow spreader 38 comprises two panels 40, 42 forming an air chamber 44 therebetween. A first one of the panels 40 has holes 46 therethrough. The two panels 40, 42 are sealingly connected to each other to substantially close the air chamber 44 except at the holes 46. In one example embodiment the two panels 40, 42 comprises one of the printed circuit boards 28 and a user input frame 42 such as the frame for at least partially holding the touch screen display 14 for example. The passageways provided by the holes 46 could be provided by slits, air gaps, air channels, conduits, and/or holes.

Modern personal electronic devices, including wireless communication devices, are more and more used to watch and listen to multimedia such as music and movies. Such devices are frequently used with headsets or headphones, but they are also usually provided with an internal loudspeaker. However, small devices have only small spaces available for a loudspeaker, and the space available for a loudspeaker and other components is shrinking, or at least not growing, as devices continue to shrink. Small loudspeakers tend to provide unsatisfactory listening experiences because they tend to provide unsatisfactory low-frequency responses. For a moving coil loudspeaker, the low-frequency limit is reduced, and the sensitivity is increased, as the rear volume of an acoustic back cavity increases. The rear cavity has an associated air compressibility, which increases with the rear cavity volume and decreases with the area of the speaker cone compressing the air. With a larger speaker cone area, or a smaller rear cavity, the air is less compressible so that increased force is needed to compress it. The fundamental resonance of a speaker system depends on the mass of the driver, and the combination of the incompressibility of the air in the rear cavity and the stiffness of the suspension of the cone. These factors combine to increase the fundamental frequency as the rear cavity volume becomes smaller. Similar principles are applicable to other loudspeaker designs, such as piezo and electrostatic loudspeakers.

Incorporating a large rear cavity into a speaker design that is to be used in a portable electronic device is difficult as devices are tending to become smaller and thinner, with smaller transducers being used in speakers and with accompanying degradation in performance. However, with use of the airflow spreader 38 additional distributed spaces with the apparatus 10 may be used to provide an effectively larger acoustic back cavity system.

Figure 4:
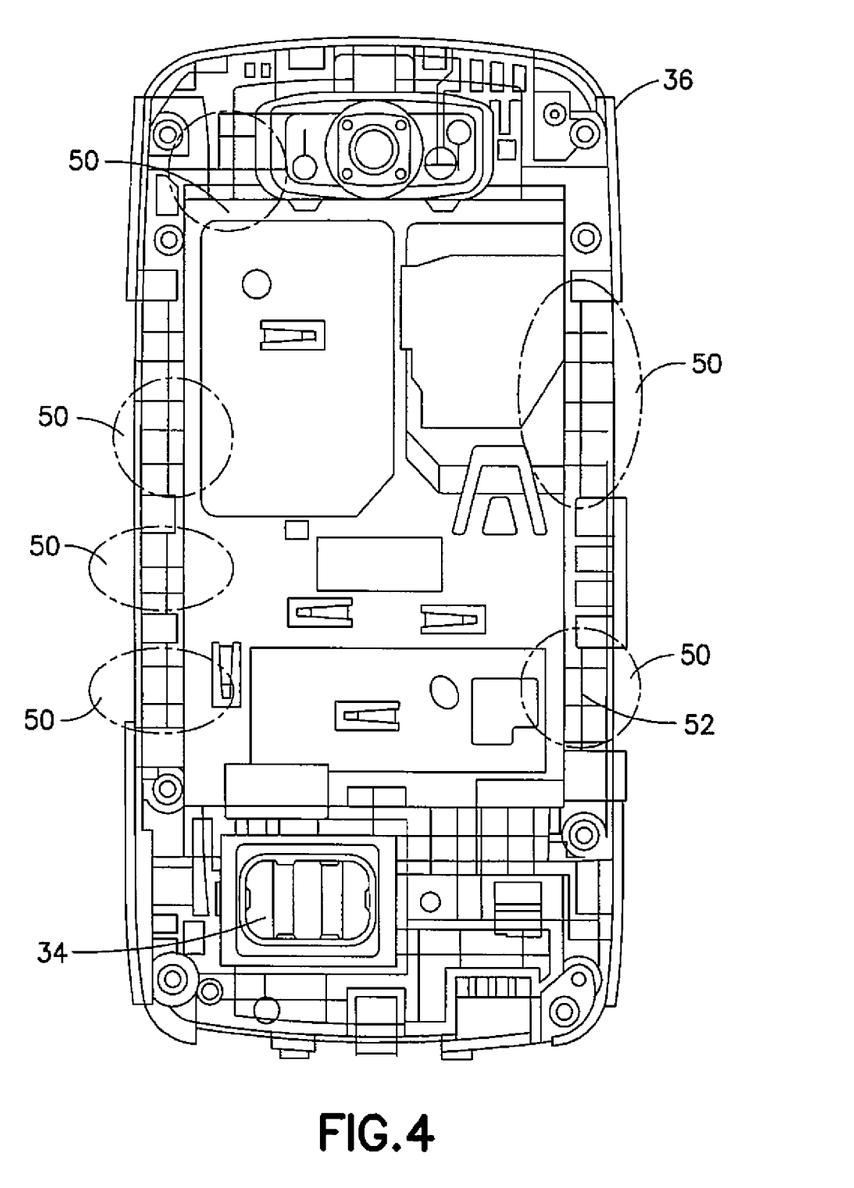
FIG. 4 is a diagram similar to FIG. 3 showing empty previously unused cavities in the cover.
Figures 5, 6:
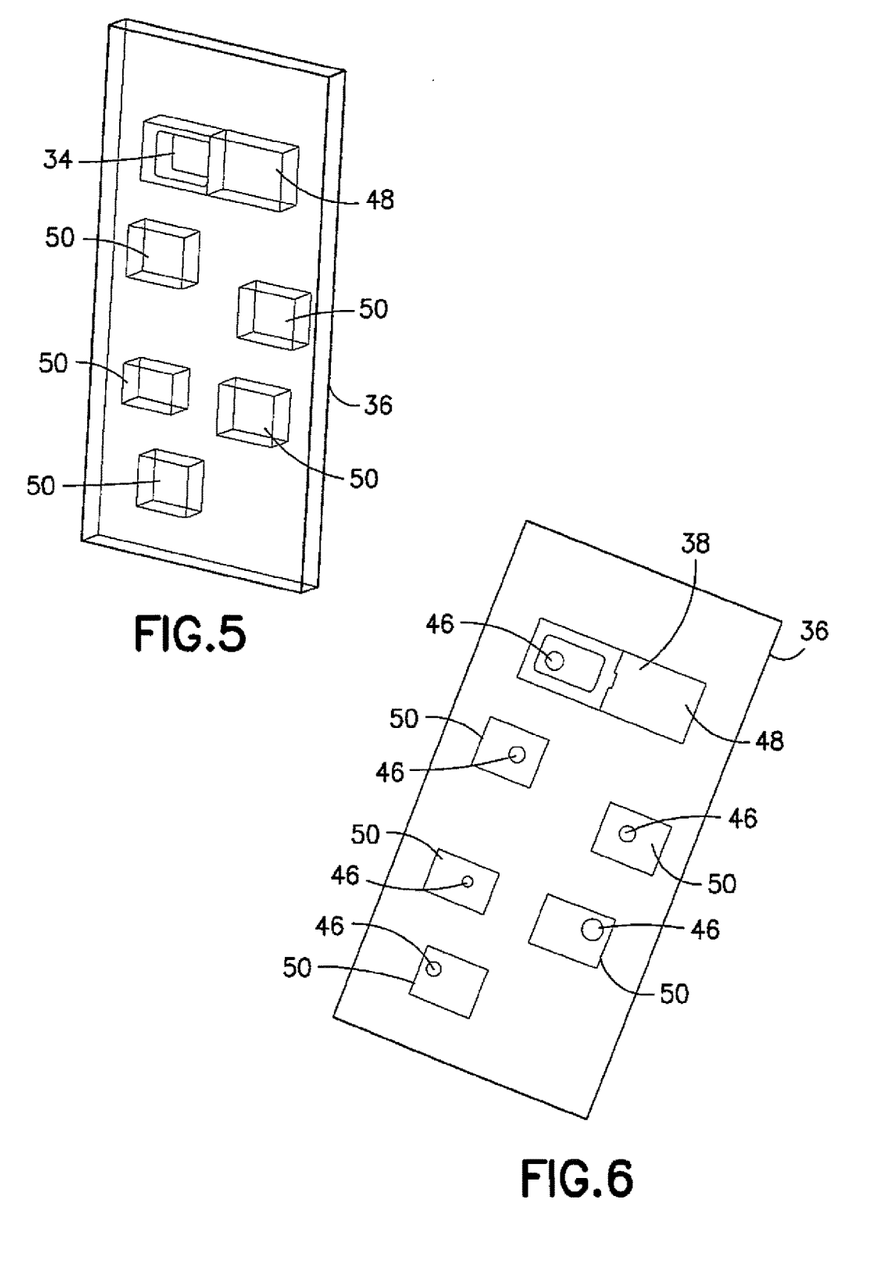
FIG. 5 is a schematic diagram of the cover showing the cavities in the cover.
FIG. 6 is a diagram similar to FIG. 5 showing location of the holes of the airflow spreader when the spreader has been connected to the cover.

Referring also to FIGS. 4 and 5, the cover 36 has the speaker 34 mounted thereon. FIG. 5 is a schematic illustration of the cover 36. The cover 36 forms an acoustic back cavity 48 for the speaker 34. The cover 36 also has a plurality of other second cavities 50 at spaced locations around the cover 36. These cavities 50 are illustrated by circled areas in FIG. 4. These cavities 50 are substantially empty; perhaps with internal walls 52 for structural rigidity of the cover 36. One Or more of the cavities 50 might have some of the electronic circuitry of the PWB(s) 28 extending thereinto. However, when the airflow spreader 38 is connected to the cover 36, the cavities 48 and 50 are substantially sealed or closed except through a conduit system formed by the airflow spreader 38. The term "connected" should be considered the same as "coupled" or "attached".

Figure 7:
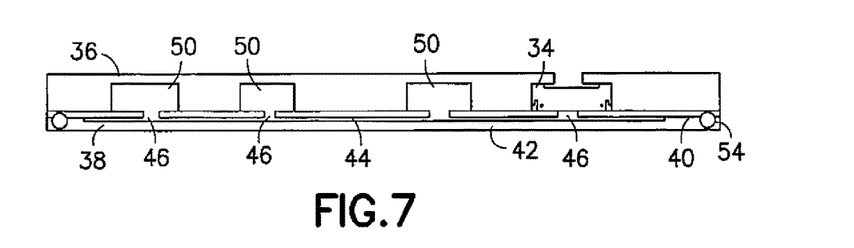
FIG. 7 is a schematic cross sectional view showing the airflow spreader connected to the cover.

As described above with reference to FIG. 3, the airflow spreader 38 has holes 46. When the airflow spreader 38 is connected to the cover 36, the airflow spreader 38 substantially closes the cavities 48, 50 with the holes 46 being aligned with the cavities 48, 50 to couple the cavities with the main chamber 44. Thus, as illustrated by FIGS. 6 and 7, the airflow spreader 38 forms a conduit system to interconnect all the cavities 48, 50 together.

The simplest way to extend low frequency playback of an acoustic system is to enlarge the back cavity volume. Features as described herein may be used to maximize use of otherwise unused space inside the apparatus 10 as the back cavity volume for the speaker, and to keep the apparatus as a slim design as well. A normal way for a speaker system to be designed is to leave a maximum part of the phone as an acoustic back cavity. However, sometimes, even with designing in a maximum part for the speaker back cavity, the space is still not enough because of the limited dimensions of the apparatus housing. With features as described herein, spaces in the apparatus may be utilized to effectively increase an area for low frequency sound; thus extending the low frequency of sound from the speaker. This advantage is particularly helpful in full touch screen mobile phones, for example, where empty interior space is very limited.

The speaker may be assembled in the bottom of the phone to share the volume of an antenna to get the biggest back cavity volume. By additionally using other space in combination with the normal acoustic back cavity for an enlarged effective acoustic back cavity system, the back cavity volume may be increased, such as doubled for example. Low frequency capability may be increased by lowering the low frequency range (see 82 in FIG. 8 versus 80 in FIG. 8). To utilize the spaces that are not usually used for an acoustic back cavity, a new mechanical solution is provided. The biggest difficulty for utilizing the cavities 50 is that the unused spaces are distributed all over the cover 36 and would otherwise be hard to be connected.

One example of the mechanical solution may comprise a cover 36 which will hold the speaker and has a one basic cavity 48. There are several distributed spaces 50 that may be used as additional cavities. There is no limitation to each distributed cavity's size or shape. The "airflow spreader" may cover all the selected distributed cavities. In one example the "spreader" may be two panels (or other similar members) with a certain gap to form the air chamber 44, but well sealed all around. In a mobile phone design, this "spreader" can use the PWB and UI frame by adding a gasket 54 in between. On the panel that covers the cover 36, holes 46 may be provided for each of the corresponding main and distributed cavities 48, 50 with proper pre-determined designed diameters. Airflow can reach to every single distributed cavity 50 through the holes 46 and the chamber 44 of the spreader. The spreader may be designed inside a main PWB, a phone cover, a chassis, and/or formed via other parts providing substantially sealed acoustic paths.

Figure 8:
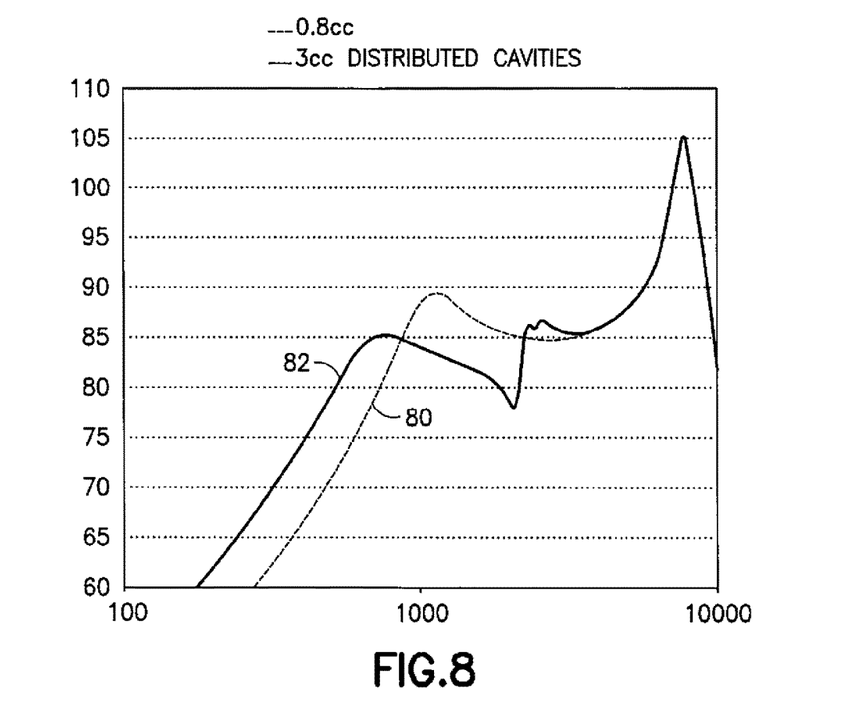
FIG. 8 is a chart showing an acoustic simulation for a design having a single 0.8 cc back cavity design versus a design having the 0.8 cc back cavity in combination with an additional 2.2 cc from connected distributed speaker cavities to form a total of 3 cc.
Figure 9:
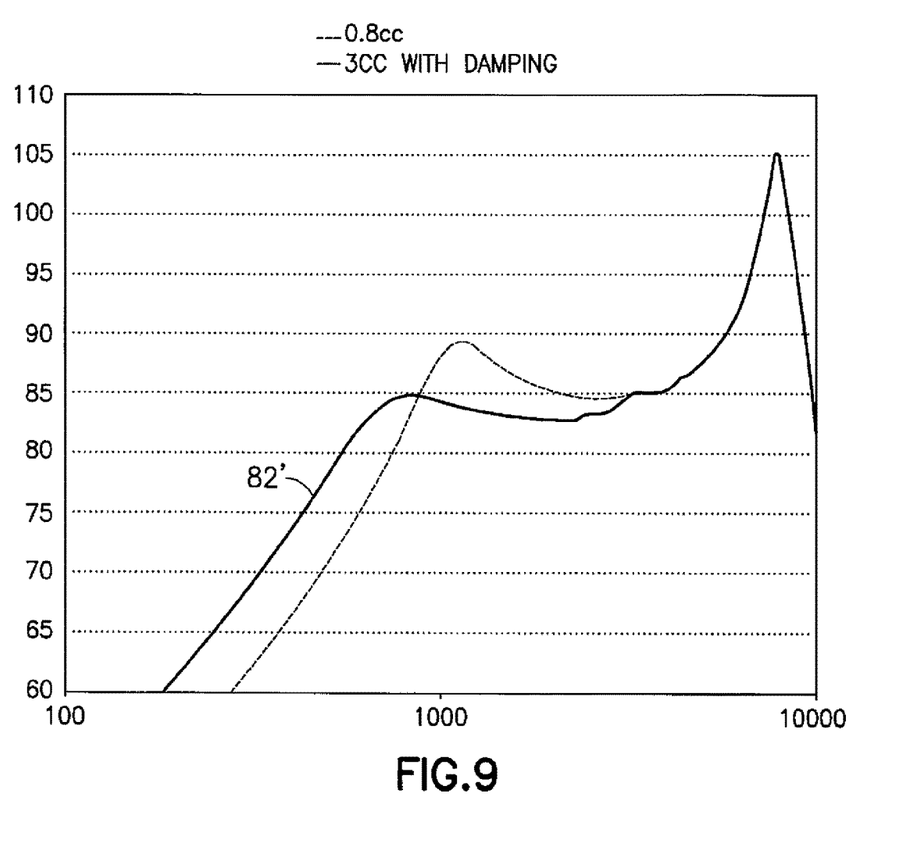
FIG. 9 is a chart similar to FIG. 8, but showing the effect of adding dampening material for dampening harmful resonance in the mid frequency.

Acoustic simulation for a single 0.8 cc back cavity 48 and a 3 cc distributed speaker cavities design is shown in FIG. 8. As seen in this chart, the combined multi-cavity design 82 can provide a lower frequency response than the single cavity design 80. There is some harmful resonance in the mid-frequency. However, as illustrated by FIG. 9, this can be conquered by adding damping material at the holes of the speaker or main cavity as shown by 82'.

Figure 10:
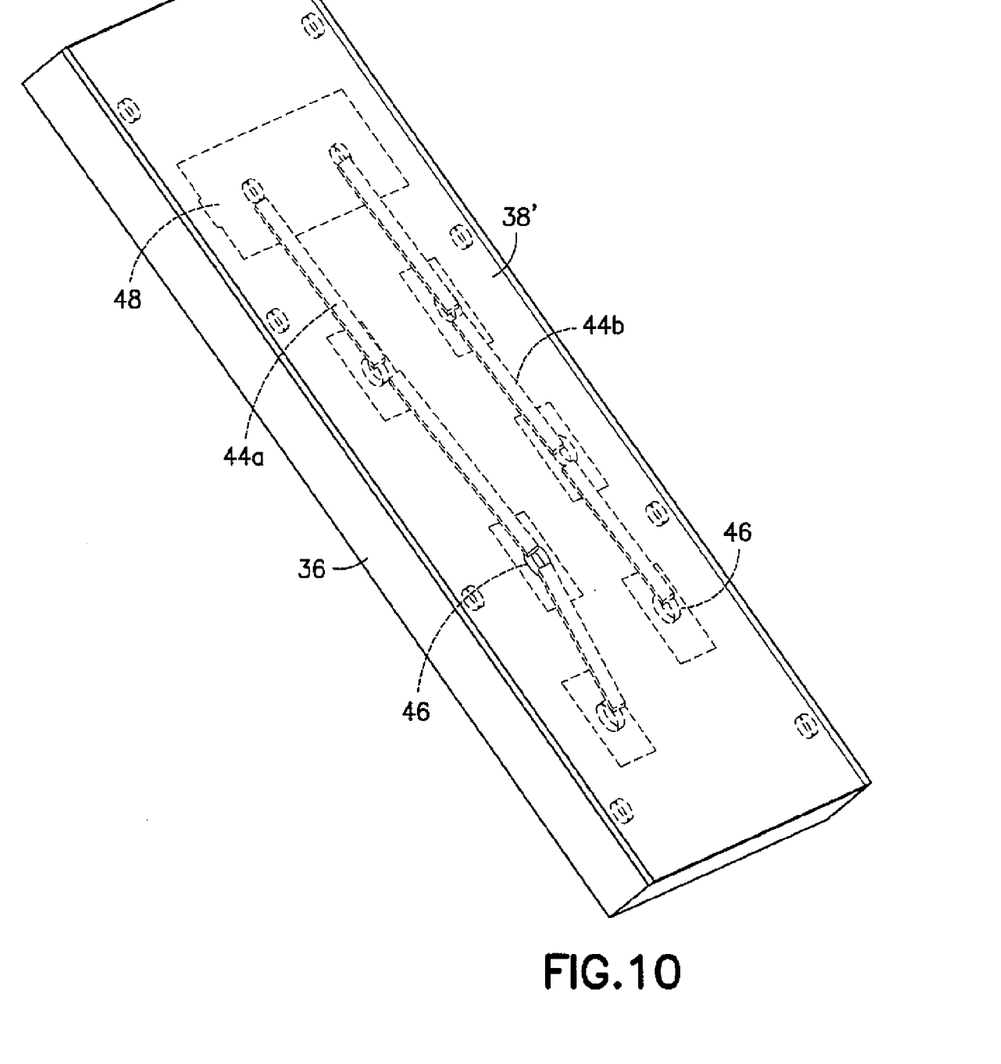
FIG. 10 is a diagram illustrating another example.

The example described above comprises an airflow spreader with a single air chamber 44 connecting the holes 46 for the cavities 50 to the hole 46 of the main back cavity 48. However, the airflow spreader may comprise more than one internal air chamber. Referring also to FIG. 10, in this example the cover 36 has the airflow spreader 38' attached. The spreader has two conduits 44a, 44b from the main acoustic back cavity 48 to the holes 46 of the additional cavities 50. The conduits 44a, 44b may be formed in a PWB. Circuitry may be re-designed around the conduits, and/or the conduits may have designed paths around circuitry on the PWB. In another example the cover 36 may form part of the conduits 44.

In accordance with one example embodiment, an apparatus 10 comprises a housing member 36 includes an acoustic back cavity 48 for a sound transducer 34 and at least two second cavities 50 in the housing member spaced from the acoustic back cavity; and an airflow spreader 38 connected to the housing member 36, where the airflow spreader comprises a conduit system 44, 46 connecting the acoustic back cavity 48 directly with each of the at least two second cavities 50 through the airflow spreader.

The "housing member" may comprise multiple members connected to one another. For example, there are speaker modules which comprise both a transducer and a back cavity. The speaker module may be merely located in a seat of another member, such as inside a cover of a mobile phone. The associated distributed cavities in the cover may be acoustically connected to the back cavity in the speaker module meaning. Thus, the acoustic back cavity is provided inside the speaker module rather than the cover. However, the cover and the module together form the "housing member". The housing member could also comprise a PWB, a chassis, a flat display module, a battery holder and/or a battery itself, etc.

The housing member may comprise a cover member for a hand-held portable electronic device. The apparatus may further comprise a speaker connected to the housing member adjacent the acoustic back cavity, where the speaker forms the sound transducer. The at least two second cavities 50 may comprise different electronic circuitry therein. The at least two second cavities 50 may each be substantially sealed except for an aperture 46 into the conduit system of the airflow spreader. The airflow spreader may comprise two panels 40, 42 sealingly connected to each other with an air chamber 44 therebetween as part of the conduit system, and holes 46 though one of the panels into respective ones of the acoustic back cavity 48 and the at least two second cavities 50. A first one of the panels may comprise a printed wiring board of the apparatus. A second one of the panels may comprise a user interface frame member, where the user interface frame member holds a user interface of the apparatus. The air chamber may connect multiple ones of the second cavities to the acoustic back cavity. The air chamber may comprise multiple conduits connecting the second cavities to the acoustic back cavity in parallel and/or series. The apparatus may further comprise means for effectively combining the acoustic back cavity 48 with the at least two second cavities 50 via the airflow spreader 38 to create an effectively greater acoustic back cavity enclosure for the sound transducer. The acoustic back cavity and the at least two second cavities may be coupled by the conduit system of the airflow spreader to achieve a desired fundamental low frequency extension for the sound transducer. The apparatus may further comprise dampening material at a hole from the acoustic back cavity to the conduit system of the airflow spreader. The airflow spreader may be connected to a first distributed cavity which is connected in series with at least one other distributed cavity such as by an internal connection which is not part of the spreader.

In accordance with another example, an apparatus may comprise a sound transducer 34; a housing 36 having the sound transducer connected thereto; and an acoustic back cavity system comprising a main back cavity 48 in the housing adjacent the sound transducer and a plurality of spaced additional cavities 50 in the housing connected in parallel with the main back cavity by a substantially closed air conduit system 44, 46. The air conduit system may comprise two panels sealingly connected to each other with an air chamber therebetween as part of the air conduit system, and holes though one of the panels into respective ones of the main back cavity and the additional cavities. A first one of the panels may comprise a printed wiring board of the apparatus. A second one of the panels may comprise a user interface frame member, where the user interface frame member holds a user interface of the apparatus.

Figure 11:
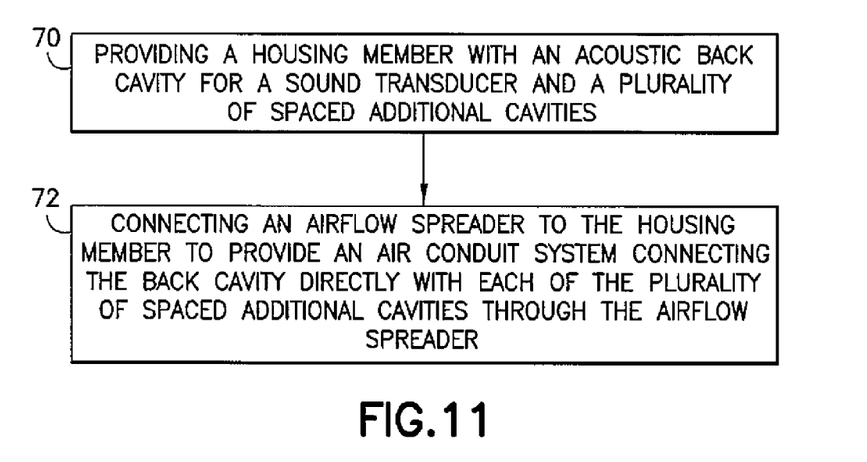
FIG. 11 is a chart illustrating an example method.

Referring also to FIG. 11, an example method may comprise providing a housing member with an acoustic back cavity for a sound transducer and a plurality of spaced additional cavities as indicated by block 70; and connecting an airflow spreader to the housing member to provide an air conduit system connecting the back cavity directly with each of the plurality of spaced additional cavities through the airflow spreader as indicated by block 72. The airflow spreader may comprise two panels sealingly connected to each other with an air chamber therebetween as part of the air conduit system, and holes though one of the panels into respective ones of the main back cavity and the additional cavities. A first one of the panels may comprise a printed wiring board of the apparatus. A second one of the panels may comprise a user interface frame member, where the user interface frame member holds a user interface of the apparatus.

Concerning the volume of a loudspeaker rear cavity, which defines the sensitivity of the resulting speaker system and the low frequency limit which is especially vital for moving coil loudspeakers, it can be stated as the bigger the rear volume the lower the frequency or alternatively the bigger the rear volume the higher the sensitivity. The reason is that the rear cavity has a stiffness associated with it, which depends on the rear cavity volume and the area of the speaker cone that is compressing it. Therefore, the larger the cone area the stiffer the air appears to be and the smaller the rear volume the stiffer the air appears to be. In both cases more force is required to compress the air in the rear cavity. The fundamental resonance of a speaker system depends on the mass of the driver, the combined stiffness of the air in the rear cavity and the suspension of the cone. The combination is stiffer than either the speaker or the rear cavity on its own, and therefore the resonance frequency becomes higher. As a result, for the system needs bass response improving without changing electro-acoustic characteristics, there is need for a larger rear cavity which in turn exhibits a smaller stiffness and hence a lower system resonance. Similar principle also applies on piezo and electrostatic loudspeakers. Thus, the back cavity requirement is also relevant for other loudspeaker modules (i.e. piezoelectric, electrostatic, etc.). Any speaker system radiating sound waves front and back would benefit from a controlled back cavity design.

The need of a larger rear cavity becomes more problematic when smaller transducers are designed for portable devices, wherein the portable device sizes are also getting smaller and smaller which generates problems for transducer integrations. Currently, there is a drive towards thinner products and larger displays. Unfortunately, this puts design pressure on the loudspeaker to be reduced in size. It is a known problem that size reduction of electrodynamic transducers cause degradation in performance. This issue causes conflict when considering the trend in mobile devices where handsfree playback for music, ringtones and even speech becomes more and more popular. As a result, there is a strong motivation to achieve a good sound quality in mobile devices.

Features as described herein are used in maximizing the potential air volume for a speaker design inside an apparatus by using the pre-determined air spaces without influencing the apparatus size. This provides a distributed back cavities concept, comprising multiple cavities in parallel for one speaker without a vented structure. It is an enclosure air conduit design. This may be used to maximize utilization of all (or at least are large amount) of otherwise unused space in a given mechanical architecture to achieve an enhanced a low frequency extension for a speaker. The principle is totally different from a vented design or adding a separate bass unit.

In alternative embodiments the spreader may be configured in one plane which is mechanically and acoustically connected to a plurality of the acoustic cavities (the main back cavity and the distributed cavity(ies)), wherein the acoustic cavities are positioned in a same plane or in another plane (i.e. FIGS. 5 and 7). In alternative embodiments, the spreader and the cavities may be in different planes relative to each other.

A goal of features described herein is a space efficient mechanical integration without degrading acoustic performance. The features provide an opportunity to design larger air cavities for acoustic designs without making the size of the product larger. Such a larger "combination" acoustic cavity enhances sound characteristics and, in this regard, we can say a sound enhancement is achieved.

Although use of an acoustic back cavity is known, and such parameter defines a low frequency cut-off, not every acoustic cavity would provide a low frequency extension. With features as described herein, it is possible to extend low frequencies by increasing the volume of the acoustic cavity to provide a low frequency extension.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

I claim:

1. An electronic device comprising:
at least one processor and at least one memory storing a program of instructions, and wherein the memory storing the program of instructions is configured, with the at least one processor, to perform control and processing functions for the electronic device;
a device housing comprising at least one housing member, wherein the device housing is configured to accommodate a plurality of electronic components of the electronic device;
a first cavity within the at least one housing member;
a speaker acoustically coupled to the first cavity, such that the first cavity forms an acoustic back cavity for the speaker;
a plurality of further cavities at spaced locations about the at least one housing member; and
an airflow spreader providing connection between the first cavity and the plurality of further cavities to form an air chamber for the speaker, wherein the airflow spreader comprises a conduit system wherein a first opening into the conduit system provides a connection with the first cavity, and each of one or more additional openings into the conduit system provides a connection with a respective one of the further cavities, such that the first opening and the one or more additional openings connect the first cavity to the plurality of further cavities through the conduit system of the air chamber.

2. The electronic device of claim 1, wherein the airflow spreader comprises first and second panels enclosing an internal air chamber therebetween.

3. The electronic device of claim 1, wherein the airflow spreader is attached to the housing member so as to substantially close the first cavity and the further cavities except at the first opening and the one or more additional openings.

4. The electronic device of claim 1, wherein the one or more additional openings comprise one additional opening providing a connection into each of the respective further cavities, such that the first opening and the one or more additional openings provide a connection between the first cavity and all of the further cavities through the air chamber.

5. The electronic device of claim 1, wherein at least one portion of the airflow spreader comprises electronic circuitry.

6. The electronic device of claim 2, wherein the airflow spreader comprises first and second panels enclosing the internal air chamber therebetween, wherein at least a first one of the panels comprises electronic circuitry.

7. The electronic device of claim 1, wherein the memory storing the computer program code is configured, with the at least one processor, to control the electronic device to support one or more of: a telephone application, an Internet browser application, a video recorder application, a music player and recorder application, an email application, a navigation application, or a gaming application.

8. The electronic device of claim 1, wherein at least one of the further cavities comprises internal walls to enhance structural rigidity of the housing member.

9. The electronic device of claim 1, wherein the device housing encloses electronic circuitry and wherein at least a portion of the electronic circuitry extends into at least one of the further cavities.

10. The electronic device of claim 1, wherein the first and second panels are sealingly connected to substantially close the internal air chamber except at the openings.

11. The electronic device of claim 10, wherein the first and second panels are sealingly connected by a gasket between the first and second panels.

12. The electronic device of claim 1, wherein the airflow spreader substantially seals the back cavity and the further cavities of the housing member other than through the conduit system of the airflow spreader.

13. The electronic device of claim 1, wherein the airflow spreader comprises a single internal air chamber, and wherein the single internal air chamber provides a connection between the opening into the first cavity and the openings into the further cavities.

14. The electronic device of claim 1, wherein the housing member comprises multiple members connected to one another.

15. The electronic device of claim 14, wherein the housing member comprises a speaker module seated inside a housing cover.

16. The electronic device of claim 14, wherein the housing member comprises one or more of a printed wiring board, a chassis, a flat display module, a battery holder, and a battery.

17. The electronic device of claim 7, wherein the electronic device is a hand-held portable electronic device.

18. An electronic device comprising:
at least one processor and at least one memory storing a program of instructions, and wherein the memory storing the program of instructions is configured, with the at least one processor, to perform control and processing functions for the electronic device;

at least one housing member for an acoustic back cavity system for a device housing configured to accommodate a plurality of electronic components of the electronic device;

a first cavity within the at least one housing member, wherein the first cavity comprises at least a portion of the acoustic back cavity system;

a speaker acoustically coupled to the first cavity such that the first cavity forms an acoustic back cavity for the speaker;

a plurality of further cavities at spaced locations disposed with respect to the at least one housing member so as to form an enlarged acoustic back cavity for the speaker, and wherein the plurality of further cavities are substantially sealed; and an airflow spreader acoustically connected to the first cavity, wherein the airflow spreader comprises a conduit system comprising one or more openings and acoustic paths, wherein the acoustic paths are substantially sealed, and disposed so as to interconnect all cavities together, such that the first cavity and the plurality of further cavities comprise a substantially sealed acoustic back chamber.

19. The electronic device of claim 18, wherein the airflow spreader comprises first and second panels enclosing an air chamber therebetween.

20. The electronic device of claim 18, wherein at least one portion of the airflow spreader comprises electronic circuitry.

* * * * *